(12) United States Patent
Kim et al.

(10) Patent No.: US 12,282,140 B2
(45) Date of Patent: Apr. 22, 2025

(54) FLEXIBLE WINDOW FILM AND DISPLAY APPARATUS COMPRISING SAME

(71) Applicant: Samsung SDI Co., Ltd., Yongin-si (KR)

(72) Inventors: Yong Woon Kim, Suwon-si (KR); Nak Hyun Sung, Suwon-si (KR); Min Hye Kim, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 282 days.

(21) Appl. No.: 17/754,639

(22) PCT Filed: Sep. 25, 2020

(86) PCT No.: PCT/KR2020/013147
§ 371 (c)(1),
(2) Date: Apr. 7, 2022

(87) PCT Pub. No.: WO2021/071152
PCT Pub. Date: Apr. 15, 2021

(65) Prior Publication Data
US 2022/0390649 A1    Dec. 8, 2022

(30) Foreign Application Priority Data

Oct. 7, 2019   (KR) ........................ 10-2019-0124036

(51) Int. Cl.
| | |
|---|---|
| C09D 5/18 | (2006.01) |
| B32B 7/02 | (2019.01) |
| B32B 7/12 | (2006.01) |
| B32B 15/02 | (2006.01) |
| B32B 15/04 | (2006.01) |
| B32B 15/088 | (2006.01) |
| B32B 27/34 | (2006.01) |
| C08J 5/18 | (2006.01) |
| C08J 7/04 | (2020.01) |
| C08J 7/044 | (2020.01) |
| C09D 5/00 | (2006.01) |
| C09D 5/24 | (2006.01) |
| C09D 7/20 | (2018.01) |
| C09D 7/40 | (2018.01) |
| C09D 133/10 | (2006.01) |
| C09D 179/08 | (2006.01) |
| G02B 1/14 | (2015.01) |
| G02B 1/16 | (2015.01) |
| G02B 7/20 | (2021.01) |

(52) U.S. Cl.
CPC ................. *G02B 1/14* (2015.01); *B32B 7/02* (2013.01); *B32B 15/02* (2013.01); *B32B 15/043* (2013.01); *B32B 15/088* (2013.01); *B32B 27/34* (2013.01); *C08J 5/18* (2013.01); *C08J 7/042* (2013.01); *C08J 7/0427* (2020.01); *C08J 7/044* (2020.01); *C09D 5/002* (2013.01); *C09D 5/24* (2013.01); *C09D 7/20* (2018.01); *C09D 7/70* (2018.01); *C09D 133/10* (2013.01); *C09D 179/08* (2013.01); *G02B 1/16* (2015.01); *B32B 7/12* (2013.01); *B32B 2255/06* (2013.01); *B32B 2255/10* (2013.01); *B32B 2255/26* (2013.01); *B32B 2307/412* (2013.01); *B32B 2307/418* (2013.01); *B32B 2307/536* (2013.01); *B32B 2307/546* (2013.01); *B32B 2457/20* (2013.01); *C08J 2379/08* (2013.01); *C08J 2433/10* (2013.01); *C08J 2479/08* (2013.01)

(58) Field of Classification Search
None
See application file for complete search history.

(56) References Cited

U.S. PATENT DOCUMENTS

| | | | |
|---|---|---|---|
| 2016/0039977 A1 | 2/2016 | Cho et al. | |
| 2017/0183462 A1 | 6/2017 | Song et al. | |
| 2019/0009505 A1 | 1/2019 | Song et al. | |
| 2019/0112429 A1* | 4/2019 | Bae .................. | H05K 5/0017 |

FOREIGN PATENT DOCUMENTS

| | | |
|---|---|---|
| CN | 107976830 A | 5/2018 |
| CN | 109765642 A | 5/2019 |
| JP | 2008-037101 A | 2/2008 |
| JP | 2010-217873 A | 9/2010 |
| JP | 2018-119144 A | 8/2018 |
| JP | 2019-086769 A | 6/2019 |
| KR | 10-2019-0005673 A | 1/2019 |
| KR | 10-2019-0081817 A | 7/2019 |
| WO | WO 2018-230495 A1 | 12/2018 |

OTHER PUBLICATIONS

Translation of KR 10-2019-0081817 A.*
Chinese Office Action dated Feb. 10, 2023 issued in corresponding Chinese Patent Application No. 202080070351.3 (8 pages).
International Search Report of PCT/KR2020/013147, Jan. 13, 2021, 5 pages.

* cited by examiner

*Primary Examiner* — Sheeba Ahmed
(74) *Attorney, Agent, or Firm* — Womble Bond Dickinson (US) LLP

(57) ABSTRACT

Provided are a flexible window film and a display apparatus comprising same, the flexible window film having a substrate layer, a buffer layer and a hard coating layer that are sequentially layered, wherein the buffer layer comprises, in a thickness direction, a first area in which the amount of an amide group gradually increases from the interface between the hard coating layer and the buffer layer, and a second area in which the amount of an amide group gradually decreases from the interface between the substrate layer and the buffer layer.

18 Claims, 2 Drawing Sheets

[FIG. 1]
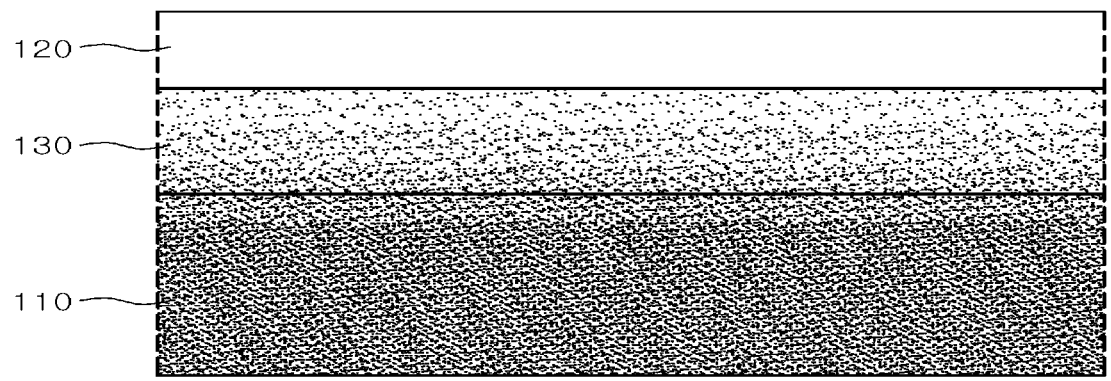
[FIG. 2]
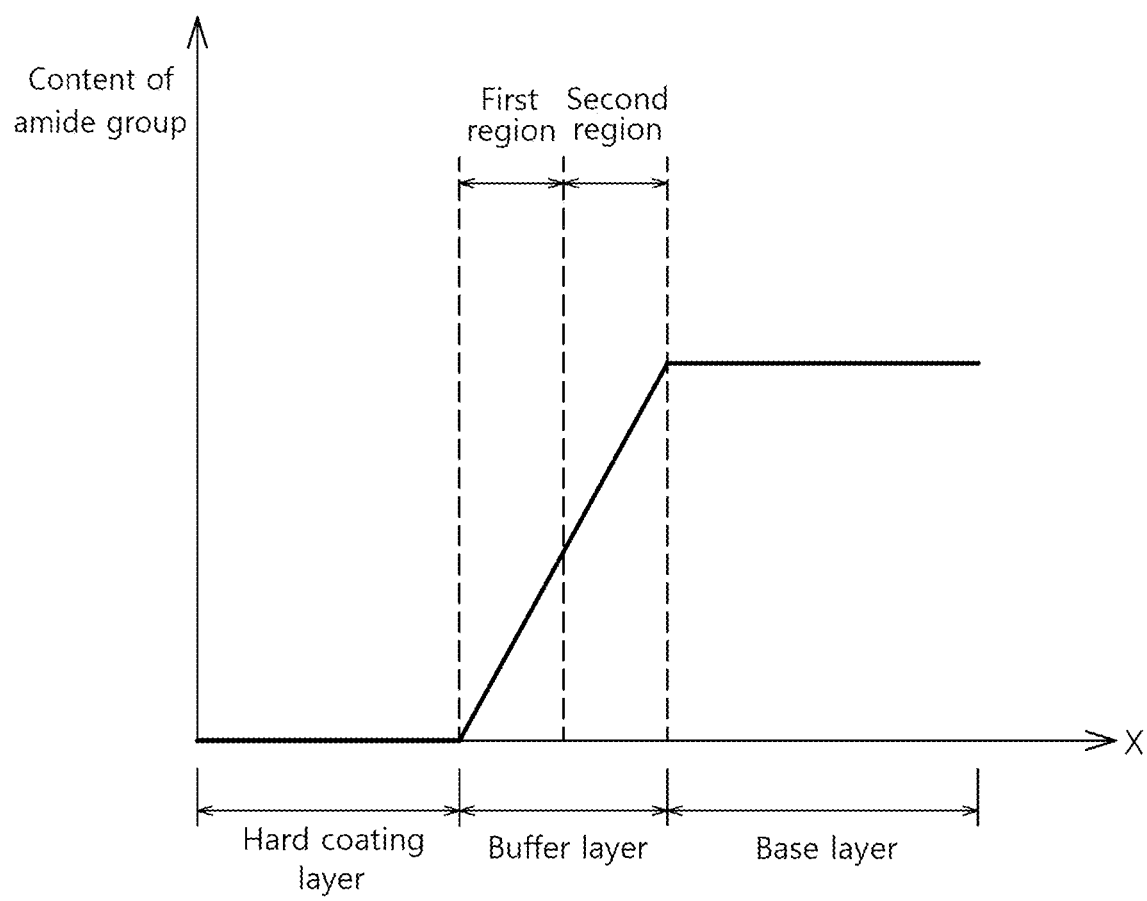

[FIG. 3]
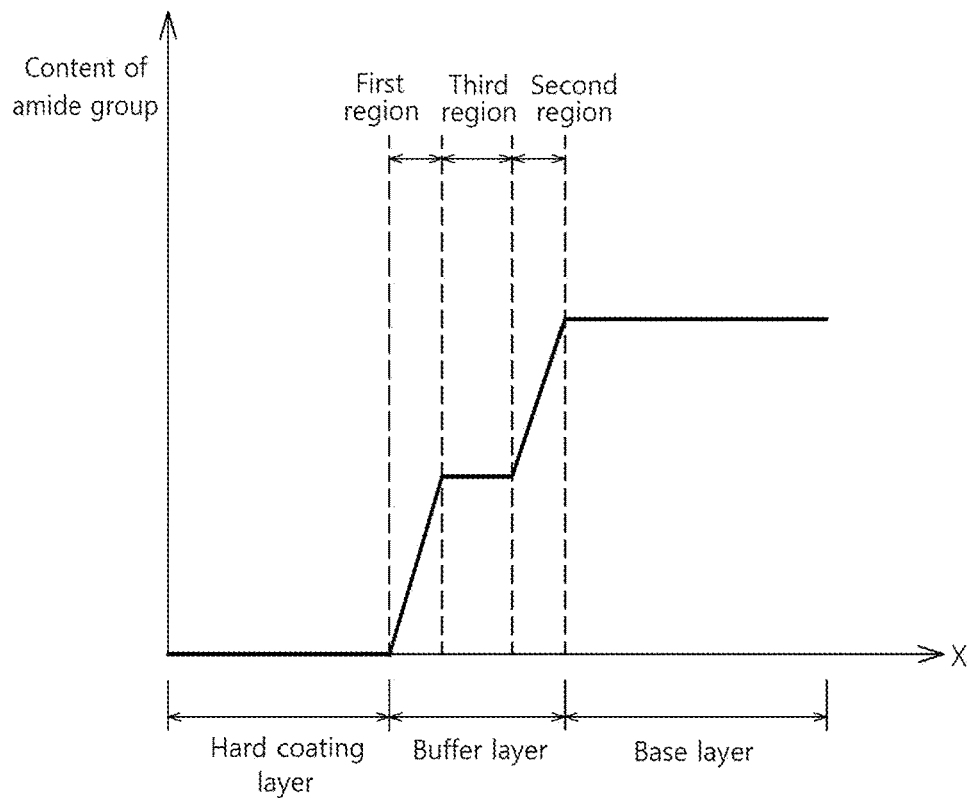
[FIG. 4]
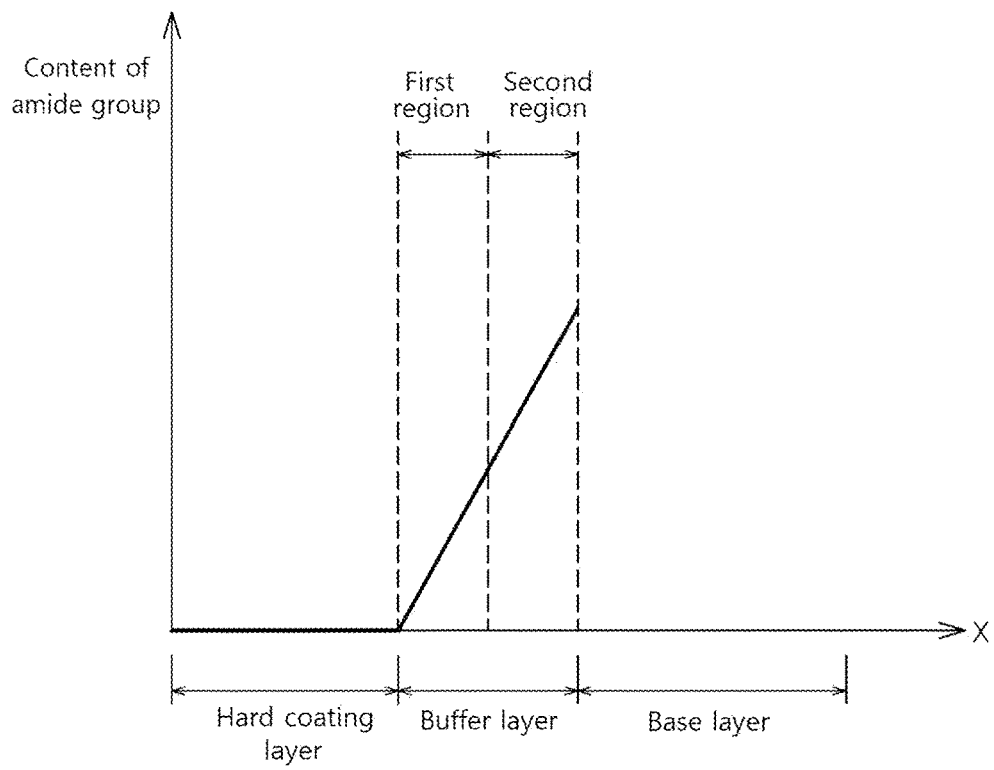

FLEXIBLE WINDOW FILM AND DISPLAY APPARATUS COMPRISING SAME

CROSS-REFERENCE TO RELATED APPLICATIONS

This application is a U.S. National Phase Patent Application of International Application Number PCT/KR2020/013147, filed on Sep. 25, 2020, which claims priority of Korean Patent Application Number 10-2019-0124036, filed on Oct. 7, 2019, the entire content of each of which is incorporated herein by reference.

TECHNICAL FIELD

The present invention relates to a flexible window film and a display apparatus including the same. More particularly, the present invention relates to a flexible window film that can prevent rainbow spots from being observed and exhibits good flexural reliability, and a display apparatus including the same.

BACKGROUND ART

In recent years, there is growing interest in a flexible display apparatus. In response to such an interest, a window film mounted on the flexible display apparatus is also required to have flexibility. Since the window film serves to protect optical elements in the display apparatus, the window film necessarily includes a hard coating layer. By way of example, the window film includes a base layer and a hard coating layer formed on the base layer.

Since the flexible display apparatus is folded and unfolded hundreds of thousands of times in a direction of the base layer and a direction of the hard coating layer, a film applicable to the base layer is limited. A polyimide film may be used as the base layer. The inventors of the present invention confirmed that, when a (meth)acrylate-based hard coating layer is stacked on a transparent polyimide film, a severe rainbow phenomenon occurs due to a difference in index of refraction between the polyimide film and the hard coating layer and reflection at an interface between the base layer and the hard coating layer. Although the rainbow phenomenon can be prevented by reducing refractivity through dispersion of silica particles in the polyimide film, a large amount of the silica particles is necessarily used to reduce refractivity of the polyimide film, thereby causing deterioration in mechanical properties and flexibility of the polyimide film. In another method, although metal particles, such as zirconia and the like, can be dispersed in the hard coating layer, there is a problem of deterioration in screen visibility of a display apparatus due to increase in reflectivity on the surface of the hard coating layer. Accordingly, there is a need for development of a window film that can be used in a flexible display apparatus without allowing rainbow spots to be observed and does not suffer from increase in reflectivity while securing good flexural reliability.

The background technique of the present invention is disclosed in Japanese Unexamined Patent Publication No. 2008-037101 and the like.

DISCLOSURE

Technical Problem

It is one aspect of the present invention to provide a flexible window film that can prevent rainbow spots from being observed.

It is another aspect of the present invention to provide a flexible window film that exhibits good flexural reliability under high temperature/humidity conditions and at low temperature.

It is a further aspect of the present invention to provide a flexible window film that exhibits good optical transparency and a low degree of yellowness.

Technical Solution

1. In accordance with one aspect of the present invention, a flexible window film includes: a base layer; a buffer layer; and a hard coating layer sequentially stacked one above another in the stated order, wherein the buffer layer includes, in a thickness direction thereof, a first region in which the content of an amide group gradually increases from an interface between the hard coating layer and the buffer layer, and a second region in which the content of the amide group gradually decreases from an interface between the base layer and the buffer layer.

2. In 1, the first region and the second region may directly contact each other.

3. In 1 to 2, the buffer layer may further include a third region disposed between the first region and the second region and having a different content distribution of the amide group than the first region and the second region.

4. In 1 to 3, the third region may have a constant content of the amide group in the thickness direction.

5. In 1 to 4, a thickness of the third region may range from about 20% to about 80% of a total thickness of the buffer layer.

6. In 1 to 5, the buffer layer may include a poly(amide-imide) block copolymer.

7. In 1 to 6, the buffer layer may include a poly(amide-imide) block copolymer including a first segment including a structural unit of Formula 1, a structural unit of Formula 2 or a combination thereof, and a second segment including a structural unit of Formula 3-1, a structural unit of Formula 3-2 or a combination thereof.

[Formula 1]

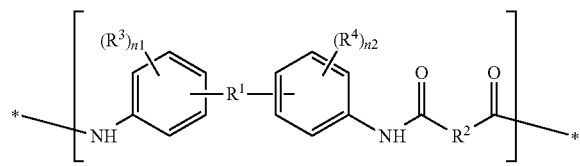

(In Formula 1, $R^1$, $R^2$, $R^3$, $R^4$, n1 and n2 are the same as defined in the detailed description.)

[Formula 2]

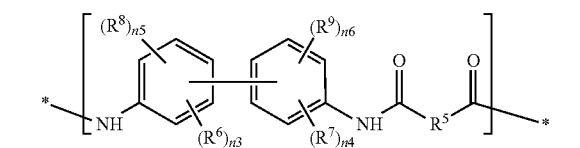

(In Formula 2, $R^5$, $R^6$, $R^7$, $R^8$, $R^9$, n3, n4, n5 and n6 are the same as defined in the detailed description.)

[Formula 3-1]

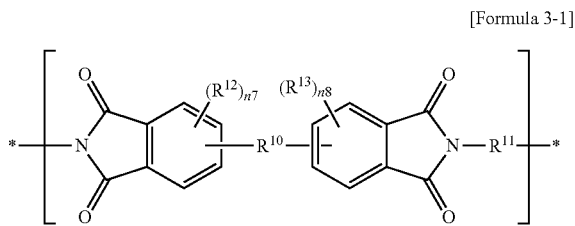

(In Formula 3-1, $R^{10}$, $R^{11}$, $R^{12}$, $R^{13}$, n7 and n8 are the same as defined in the detailed description.)

[Formula 3-2]

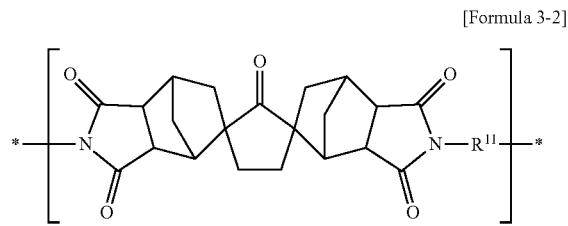

(In Formula 3-2, $R^{11}$ is the same as defined in Formula 3-1.)

8. In 1 to 7, the buffer layer may have a thickness of about 0.1 m to about 10 m.

9. In 1 to 8, the base layer may include a film including at least one selected from among a poly(amide imide) resin and a polyimide resin.

10. In 1 to 9, the base layer may include an amide group and may have a constant content of the amide group in a thickness direction of the base layer.

11. In 1 to 10, the hard coating layer may include a (meth)acrylic resin.

12. In 1 to 11, the hard coating layer may be formed of a composition including at least one selected from among a dendrimer type (meth)acrylic resin and a hyper-branched type (meth)acrylic resin.

13. In 1 to 12, the hard coating layer may be free from an amide group.

14. In 1 to 13, a difference in index of refraction between the base layer and the hard coating layer may range from about 0.1 to about 0.4.

15. In 1 to 14, the flexible window film may further include an antistatic layer at at least one of an interface between the base layer and the buffer layer and an interface between the buffer layer and the hard coating layer.

16. In 1 to 15, the antistatic layer may include metal nanowires.

In accordance with another aspect of the present invention, a display apparatus includes a flexible window film according to the present invention.

Advantageous Effects

The present invention provides a flexible window film that can prevent rainbow spots from being observed.

The present invention provides a flexible window film that exhibits good flexural reliability under high temperature/humidity conditions and at low temperature.

The present invention provides a flexible window film that exhibits good optical transparency and a low degree of yellowness.

DESCRIPTION OF DRAWINGS

FIG. 1 is a sectional view of a flexible window film according to one embodiment of the present invention.

FIG. 2 is a graph depicting a relative content of an amide group from the uppermost surface of a hard coating layer to the lowermost surface of a base layer in the flexible window film shown in FIG. 1.

FIG. 3 is a graph depicting a relative content of an amide group from the uppermost surface of a hard coating layer to the lowermost surface of a base layer in a flexible window film according to another embodiment of the present invention.

FIG. 4 is a graph depicting a relative content of an amide group from the uppermost surface of a hard coating layer to the lowermost surface of a base layer in a flexible window film according to a further embodiment of the present invention.

BEST MODE

Embodiments of the present invention will be described in detail with reference to the accompanying drawings. It should be understood that the present invention may be embodied in different ways and is not limited to the following embodiments. In the drawings, portions irrelevant to the description will be omitted for clarity. Like components will be denoted by like reference numerals throughout the specification. In the drawings, lengths, thicknesses, and the like of components are provided for illustration and the present invention is not limited thereto.

Herein, spatially relative terms such as "upper" and "lower" are defined with reference to the accompanying drawings. Thus, it will be understood that the term "upper surface" can be used interchangeably with the term "lower surface". When an element or layer is referred to as being disposed "on" another element or layer, it can be directly disposed on the other element or layer or intervening elements or layers may be present. However, when an element or layer is referred to as being "directly disposed on" another element or layer, there are no intervening elements or layers present.

Herein, in the expression "substituted or unsubstituted", "substituted" means that at least one hydrogen atom is substituted with a $C_1$ to $C_{10}$ alkyl group, a $C_3$ to $C_{10}$ cycloalkyl group, a $C_6$ to $C_{20}$ aryl group, a hydroxyl group, a halogen, an amino group, a cyano group, or a sulfide group.

Herein, "(meth)acryl" means acryl and/or methacryl.

As used herein to represent a specific numerical range, the expression "X to Y" means "greater than or equal to X and less than or equal to Y (X≤ and ≤Y)".

According to the present invention, a flexible window film (hereinafter also referred to as "window film") includes: a base layer and a hard coating layer sequentially stacked in the stated order; and a buffer layer formed at an interface between the base layer and the hard coating layer, wherein the buffer layer includes, in a thickness direction thereof, a first region in which the content of an amide group gradually increases from an interface between the hard coating layer and the buffer layer, and a second region in which the content of the amide group gradually decreases from an interface between the base layer and the buffer layer. With this structure, the window film including the base layer including at least one selected from among a polyimide group and a poly(amide imide) group, the buffer layer, and the (meth)acrylate-based hard coating layer can prevent rainbow spots from being observed.

The window film is an optically transparent film and can be used in a transparent display apparatus. The window film may have a light transmittance of about 80% or more, specifically about 85% to about 100%, and a haze of about 1% or less, specifically about 0% to about 1%, in the visible spectrum, specifically in the wavelength range of 400 nm to 800 nm. Within this range, the window film can be used as a window film for a display apparatus.

The window film may have a pencil hardness of about 3H or higher, for example, about 3H to about 9H, and a radius of curvature of about 0 mm to about 2 mm, for example, about 0.1 mm to about 2 mm. Within these ranges, the window film has good hardness and flexibility to be used as a window film for a display apparatus. The window film allows a minimum cycle of about 200,000 times or more at which cracks are generated on the hard coating layer or the base layer, upon evaluation of flexibility under conditions of 60° C. and 95% relative humidity and/or a radius of curvature of about 1 mm at −40° C., thereby securing flexural reliability under high temperature/humidity and/or at low temperature to be used in a flexible display apparatus.

When the base layer is formed of a polyimide film or a poly(amide imide) film, the window film can suffer from increase in degree of yellowness. When a poly(amide imide)-based buffer layer is further formed on the base layer, the buffer layer can affect the degree of yellowness of the window film. On the contrary, the window film according to the present invention has a degree of yellowness of about 4.0 or less, for example, about 0 to about 4.0, and thus has substantially the same degree of yellowness as a window film not including the poly(amide imide)-based buffer layer (window film consisting of the base layer and the hard coating layer).

The window film may have a thickness of about 30 μm to about 200 μm, for example, about 30 μm to about 100 μm. Within this range, the window film can be used as a flexible window film.

Next, a window film according to one embodiment of the present invention will be described with reference to FIG. 1.

Referring to FIG. 1, the window film includes a base layer 110, a hard coating layer 120 formed on one surface of the base layer 110, and a buffer layer 130 formed at an interface between the base layer 110 and the hard coating layer 120.

Base Layer

The base layer 110 may support the window film to improve mechanical strength of the window film.

The base layer 110 may be formed of an optically transparent flexible resin. The resin may include at least one selected from among a poly(amide imide) resin and a polyimide resin. Each of the poly(amide imide) group and the polyimide group may be prepared by a typical method well-known to those skilled in the art. The poly(amide imide) resin may include a poly(amide-imide) block copolymer, without being limited thereto.

In one embodiment, the base layer 110 may be formed of a base-layer composition including a poly(amide-imide) block copolymer including a first segment including a structural unit of Formula 1, a structural unit of Formula 2 or a combination thereof, and a second segment including a structural unit of Formula 3-1, a structural unit of Formula 3-2 or a combination thereof.

In one embodiment, in the poly(amide-imide) block copolymer, a mole ratio of all of the structural units of the first segment to all of the structural units of the second segment may be in the range of about 95:5 to about 5:95.

The base layer 110 may have a modulus of about 3 GPa to about 10 GPa, for example, about 4 GPa to about 7 GPa, at 25° C. Within this range, the window film does not suffer from generation of cracks and can exhibit good flexural reliability even after the window film is repeatedly folded and unfolded in the direction of the base layer and/or in the direction of the hard coating layer. Here, "modulus" may mean elastic modulus.

The base layer 110 may have a thickness of about 10 m to about 200 m, specifically about 20 m to about 150 m, more specifically about 30 m to about 100 m. Within this range, the base layer can be used in the window film. The base layer 110 may have a thickness of about 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 105 μm, 110 μm, 115 μm, 120 μm, 125 μm, 130 μm, 135 μm, 140 μm, 145 μm, 150 μm, 155 μm, 160 μm, 165 μm, 170 μm, 175 μm, 180 μm, 185 μm, 190 μm, 195 μm, or 200 μm.

As shown in FIG. 1, the base layer 110 may be a monolayer film. Alternatively, the base layer may be a laminate in which at least two resin films formed of the same composition or different compositions are stacked one above another via an adhesive layer, a bonding layer or an adhesive/bonding layer.

Although not shown in FIG. 1, the window film may further include a primer layer or a functional coating layer on one or both surfaces of the base layer 110 to provide an additional function. Preferably, the base layer 110 is a monolayer film formed of the aforementioned resin without the primer layer or the functional layer on one or both surfaces thereof.

Hard Coating Layer

The hard coating layer 120 is formed on the buffer layer 130. The hard coating layer 120 may be directly formed on the buffer layer 130. Here, "directly formed on" means that the hard coating layer 120 is directly stacked on the buffer layer 130 without an adhesive layer, a bonding layer or an adhesive/bonding layer therebetween. As described below, the hard coating layer 120 may be formed by directly coating a hard coating-layer composition on one surface of the buffer layer 130, followed by curing.

The hard coating layer 120 may have a thickness of about 1 μm to about 100 μm, specifically about 1 μm to about 80 μm, or about 1 μm to about 10 μm. Within this range, the hard coating layer 120 can be used in the flexible window film. For example, the hard coating layer 120 may have a thickness of about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, or 100 μm.

The hard coating layer 120 may be formed of a hard coating-layer composition including at least one kind of (meth)acrylic resin. The hard coating-layer composition may further include at least one selected from among a crosslinking agent and an initiator. Preferably, the hard coating-layer composition includes the (meth)acrylic resin and the initiator without the crosslinking agent.

In one embodiment, the hard coating layer may include the (meth)acrylic resin and the initiator without the crosslinking agent.

The (meth)acrylic resin may include a (meth)acrylic resin formed through polymerization of a (meth)acrylic monomer alone or through polymerization of a (meth)acrylic monomer and a comonomer copolymerizable with the (meth) acrylic monomer. The (meth)acrylic monomer may include a typical monomer well-known to those skilled in the art.

The comonomer may include a typical monomer copolymerizable with the (meth)acrylic monomer and well-known to those skilled in the art.

In one embodiment, the (meth)acrylic resin may include a resin having a (meth)acrylate group at a terminal thereof. Preferably, the (meth)acrylic resin includes a dendritic aliphatic compound having (meth)acrylate groups at terminals thereof. With the dendritic structure, the (meth)acrylic resin can have many (meth)acrylate groups at the terminals thereof, thereby improving reactivity.

The (meth)acrylic resin may be a single kind of (meth)acrylic resin or a combination of at least two types of (meth)acrylic resins. The (meth)acrylic resin may include at least one selected from a dendrimer type (meth)acrylic resin and a hyper-branched type (meth)acrylic resin. The dendrimer type (meth)acrylic resin is a branched resin with high regularity and the hyper-branched type (meth)acrylic resin is a branched resin with lower regularity than the dendrimer type resin. The hyper-branched type (meth)acrylic resin has a lower viscosity than a linear resin and can exhibit good solubility in solvents.

The dendrimer type resin may include a multi-branch type (dendrimer type) polyester (meth)acrylate having (meth)acrylate groups at terminals thereof, without being limited thereto. The hyper-branched type resin may include a multi-branch type (dendrimer type) poly(meth)acrylate having (meth)acrylate groups at terminals thereof, without being limited thereto. In one embodiment, the hyper-branched type resin may be a multi-branch type (dipentaerythritol hexaacrylate-connected) poly(meth)acrylate having a dipentaerythritol core and (meth)acrylate groups at terminals thereof, without being limited thereto.

The (meth)acrylic resin may have a weight average molecular weight of about 5,000 to about 30,000, for example, about 10,000 to about 25,000. Within this range, the window film can exhibit good hardness and scratch resistance.

The initiator is a photo-radical initiator and may include a typical photo-initiator well-known to those skilled in the art. For example, the initiator may include hydroxy ketone, phosphine oxide, benzoin or aminoketone-based photo-radical initiators. The initiator may be present in an amount of about 1 part by weight to about 10 parts by weight, preferably about 1 part by weight to about 5 parts by weight, relative to 100 parts by weight of the (meth)acrylic resin. Within this range, the composition can be suitably cured without deterioration in optical characteristics or properties. For example, the initiator may be present in an amount of about 1, 2, 3, 4, 5, 6, 7, 8, 9 or 10 parts by weight relative to 100 parts by weight of the (meth)acrylic resin.

In another embodiment, the hard coating layer may include a (meth)acrylic resin, a crosslinking agent, and an initiator.

The crosslinking agent performs crosslinking reaction with the (meth)acrylic resin and may include a (meth)acrylate compound having at least one, preferably two or more, more preferably two to twenty (meth)acrylate groups.

In one embodiment, the crosslinking agent may include a polyfunctional (meth)acrylate. The polyfunctional (meth)acrylate is contained in the hard coating-layer composition to improve hardness and flexibility of the hard coating layer.

The crosslinking agent may be present in an amount of about 5 parts by weight to about 150 parts by weight, preferably about 5 parts by weight to about 100 parts by weight, relative to 100 parts by weight of the (meth)acrylic resin. Within this range, the window film can have high hardness and can achieve improvement in flexibility. For example, the crosslinking agent may be present in an amount of about 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, or 150 parts by weight, relative to 100 parts by weight of the (meth)acrylic resin.

The hard coating-layer composition may further include additives. The additives may provide additional functions to the window film. The additives may include typical additives for window films. Specifically, the additives may include a leveling agent, a UV absorbent, a reaction suppressor, an adhesion enhancing agent, a thixotropic agent, a conductivity imparting agent, a color adjusting agent, a stabilizer, an antistatic agent, and an antioxidant, without being limited thereto. The additives may be present in an amount of about 0.01 parts by weight to about 5 parts by weight, specifically about 0.1 parts by weight to about 3 parts by weight, relative to 100 parts by weight of the (meth)acrylic resin. Within this range, the additives can improve hardness and flexibility of the window film while realizing effects of the additives. For example, the additives may be present in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or 5 parts by weight relative to 100 parts by weight of the (meth)acrylic resin.

The hard coating-layer composition may further include a solvent to improve coatability, plating properties or processability. The solvent may include at least one selected from among methyl ethyl ketone, methyl isobutyl ketone, propylene glycol monomethyl ether, and N,N-dimethyl acetamide, without being limited thereto. The solvent may be present in a balance amount in the hard coating-layer composition. The solvent may affect the content distribution of the polyamide group in the buffer layer.

The hard coating layer 120 may be formed on one surface of the buffer layer 130 by coating the hard coating-layer composition thereon, followed by curing. A method for coating the hard coating-layer composition on the buffer layer 110 is not limited thereto. For example, the coating method may include bar coating, spin coating, dip coating, roll coating, flow coating, die coating, and the like. Curing may include at least one of photo-curing and heat-curing. Photo-curing may include irradiation at a wavelength of 400 nm or less and at a dose of about 10 mJ/cm$^2$ to about 1,000 mJ/cm$^2$. Heat-curing may include coating the hard coating-layer composition to a predetermined thickness and drying at about 80° C. to about 150° C. for about 5 min to about 30 min.

Buffer Layer

The buffer layer 130 may be formed to a predetermined thickness at an interface between the base layer 110 and the hard coating layer 120. The buffer layer 130 includes, in a thickness direction thereof, a first region in which the content of an amide group gradually increases from an interface between the hard coating layer 120 and the buffer layer 130, and a second region in which the content of the amide group gradually decreases from an interface between the base layer 110 and the buffer layer 130. With this structure, the window film 130 can secure good screen quality without generation of rainbow mura when applied to a display apparatus. The window film according to the present invention can prevent rainbow mura from being observed, as compared with a window film consisting of the base layer and the hard coating layer, by controlling the content of the amide group in the thickness direction of the buffer layer instead of controlling the index of refraction of the buffer layer formed between the base layer 110 and the hard coating layer 120. In particular, when the buffer layer 130 is formed to have a difference in index of refraction between the base layer 110 and the hard coating layer 120 [the base layer having a higher index of refraction than the hard coating layer] in the range of about 0 to about 0.7, specifically about 0.1 to about 0.4, it is possible to secure good effects in improvement of rainbow characteristics. For example, the buffer layer 130 is formed to have a difference of about 0, 0.1, 0.2, 0.3, 0.4, 0.5, 0.6 or 0.7 in index of refraction between the base layer 110 and the hard coating layer 120 [the base layer having a higher index of refraction than the hard coating layer].

Next, referring to FIG. 2, the buffer layer 130 will be described in more detail.

In FIG. 2, the X-axis indicates points of the window film from the hard coating layer to the base layer in the thickness direction of the window film and the Y-axis indicates the content of the amide group at a corresponding point in the window film.

In FIG. 2, "the content of the amide group" may be measured by a typical method. Specifically, the window film is cut into a specimen having a predetermined size, followed by measuring the content of the amide group in the specimen by an IR, FT-IR or ATR (attenuated total reflectance) method.

The buffer layer includes, in the thickness direction thereof, a first region in which the content of the amide group gradually increases from the interface between the hard coating layer and the buffer layer, and a second region in which the content of the amide group gradually decreases from the interface between the base layer and the buffer layer. The first region directly adjoins the second region. The first region is a region of the buffer layer formed at the hard coating layer side and the second region is a region of buffer layer formed at the base layer side. With this structure, the buffer layer has a gradually increasing content of the amide group from the interface between the hard coating layer and the buffer layer to the interface between the buffer layer and the base layer. As a result, the window film including the base layer and the hard coating layer having different indices of refraction can prevent rainbow mura from being observed.

Since the first region directly adjoins the second region, each of the first region and the second region may have any thickness.

In one embodiment, the buffer layer may be formed of a buffer-layer composition including a poly(amide-imide) block copolymer that includes a first segment including a structural unit of Formula 1, a structural unit of Formula 2 or a combination thereof, and a second segment including a structural unit of Formula 3-1, a structural unit of Formula 3-2 or a combination thereof. The first segment is an amide block and the second segment is an imide block.

[Formula 1]

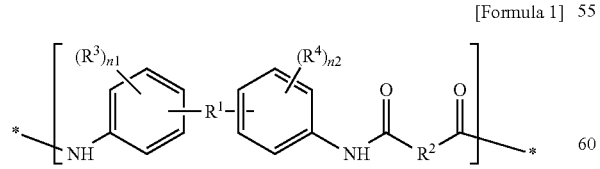

(In Formula 1,
$R^1$s are the same or different from each other in each of the structural units and are each independently a substituted or unsubstituted $C_3$ to $C_{30}$ alicyclic organic group, a substituted or unsubstituted $C_6$ to $C_{30}$ aromatic organic group, a substituted or unsubstituted $C_2$ to $C_{30}$ hetero ring group, or a substituted or unsubstituted $C_{13}$ to $C_{20}$ fluorenyl group;

$R^2$s are the same or different from each other in each of the structural units and are each independently a substituted or unsubstituted $C_6$ to $C_{30}$ aromatic organic group;

$R^3$ and $R^4$ are the same or different from each other and are each independently a halogen, a hydroxyl group, an ether group (—$OR^{200}$, $R^{200}$ being a $C_1$ to $C_{10}$ aliphatic organic group), a silyl group (—$SiR^{201}R^{202}R^{203}$, $R^{201}$, $R^{202}$ and $R^{203}$ being the same or different from one another and being each independently a hydrogen atom or a $C_1$ to $C_{10}$ aliphatic organic group), a substituted or unsubstituted $C_1$ to $C_{10}$ aliphatic organic group, or a $C_6$ to $C_{20}$ aromatic organic group; and n1 and n2 are each independently an integer of 0 to 4.)

[Formula 2]

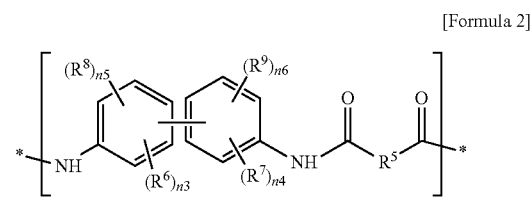

(In Formula 2,
$R^5$s are the same or different from each other in each of the structural units and are each independently a substituted or unsubstituted a $C_6$ to $C_{30}$ aromatic organic group;

$R^6$ and $R^7$ are the same or different from each other and are each independently an electron withdrawing group;

$R^8$ and $R^9$ are the same or different from each other and are each independently a halogen, a hydroxyl group, an ether group (—$OR^{204}$, $R^{204}$ being a $C_1$ to $C_{10}$ aliphatic organic group), a silyl group (—$SiR^{205}R^{206}R^{207}$, $R^{205}$, $R^{206}$ and $R^{207}$ being the same or different from one another and being each independently a hydrogen atom or a $C_1$ to $C_{10}$ aliphatic organic group), a substituted or unsubstituted $C_1$ to $C_{10}$ aliphatic organic group, or a $C_6$ to $C_{20}$ aromatic organic group;

n3 is an integer of 1 to 4, n5 is an integer of 0 to 4, and n3+n5 is an integer of 1 to 4; and n4 is an integer of 1 to 4, n6 is an integer of 0 to 4, and n4+n6 is an integer of 1 to 4.)

[Formula 3-1]

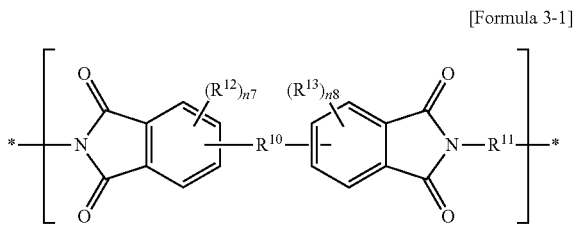

(In Formula 3-1,
$R^{10}$ s are the same or different from each other in each of the structural units and are each independently a single bond, a substituted or unsubstituted $C_1$ to $C_{30}$ aliphatic organic group, a substituted or unsubstituted $C_3$ to $C_{30}$ alicyclic organic group, a substituted or unsubstituted $C_6$ to $C_{30}$ aromatic organic group, or a substituted or unsubstituted $C_2$ to $C_{30}$ hetero ring group;

$R^{11}$s are the same or different from each other in each of the structural units and each independently include a substituted or unsubstituted $C_6$ to $C_{30}$ aromatic organic group, the aromatic organic group being present alone or as at least two aromatic organic groups bonded to form a condensation ring or bonded to each other by a single bond, a fluorenyl group, O, S, or a functional group of C(=O), CH(OH), S(=O)$_2$, Si(CH$_3$)$_2$, (CH$_2$)$_p$ (1≤p≤10, p being an integer), (CF$_2$)$_q$ (1≤q≤10, q being an integer), C(CH$_3$)$_2$, C(CF$_3$)$_2$, or C(=O)NH;

$R^{12}$ and $R^{13}$ are the same or different from each other and are each independently a halogen, a hydroxyl group, an ether group (—OR$^{208}$, $R^{208}$ being a $C_1$ to $C_{10}$ aliphatic organic group), a silyl group (—SiR$^{209}$R$^{210}$R$^{211}$, $R^{209}$, $R^{210}$ and $R^{211}$ being the same or different from one another and being each independently a hydrogen atom or a $C_1$ to $C_{10}$ aliphatic organic group), a substituted or unsubstituted $C_1$ to $C_{10}$ aliphatic organic group, or a $C_6$ to $C_{20}$ aromatic organic group; and n7 and n8 are each independently an integer of 0 to 3.)

[Formula 3-2]

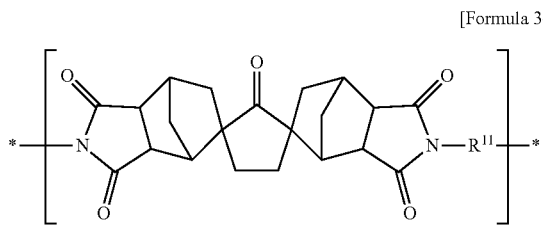

(In Formula 3-2, $R^{11}$ is the same as defined in Formula 3-1.)

$R^1$ may be selected from the group consisting of the following formulae:

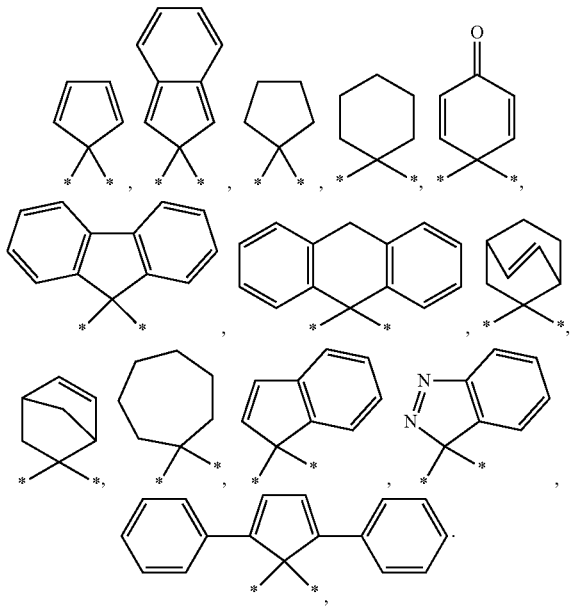

$R^6$ and $R^7$ are the same or different from each other and are each independently —CF$_3$, —CCl$_3$, —CBr$_3$, —Cl$_3$, —F, —Cl, —Br, —I, —NO$_2$, —CN, —COCH$_3$, or —CO$_2$C$_2$H$_5$.

Specifically, $R^2$ and $R^5$ are the same or different from each other and may be each independently selected from the group consisting of the following formulae:

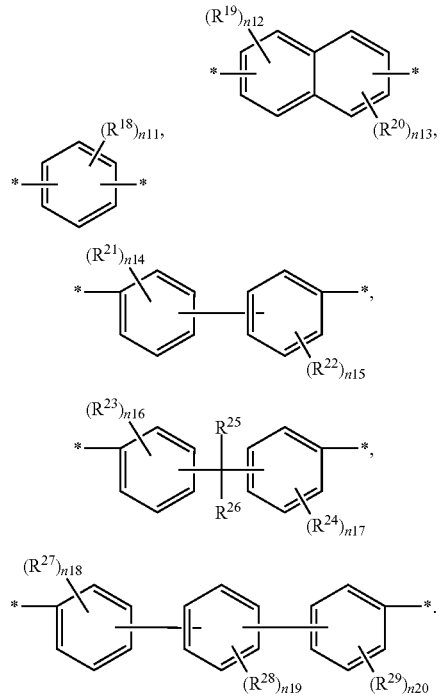

(where
$R^{18}$ to $R^{29}$ are the same or different from each other and are each independently a heavy hydrogen atom, a halogen, a substituted or unsubstituted $C_1$ to $C_{10}$ aliphatic organic group, or a substituted or unsubstituted $C_6$ to $C_{20}$ aromatic organic group;

n11 and n14 to n20 are each independently an integer of 0 to 4; and n12 and n13 are each independently an integer of 0 to 3.)

More specifically, $R^2$ and $R^5$ are the same or different from each other and are each independently may be selected from the group consisting of the following formulae:

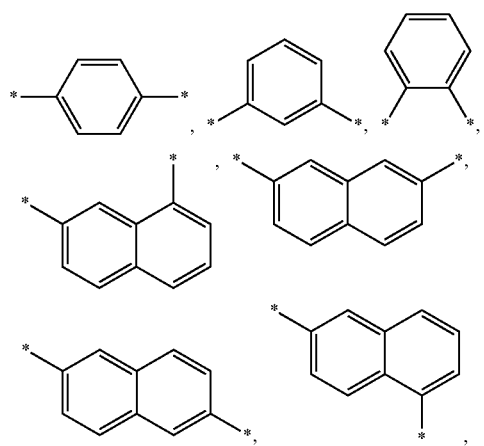

-continued

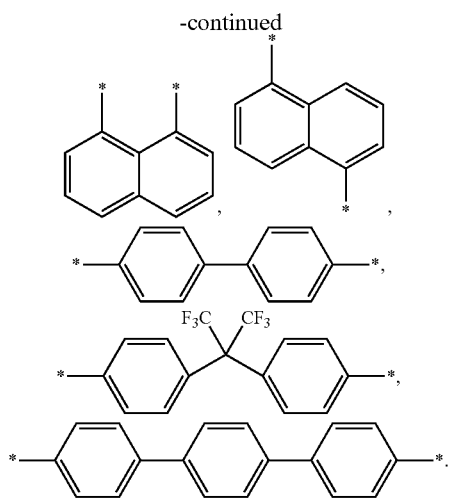

The first segment may further include a structural unit represented by Formula 4.

[Formula 4]

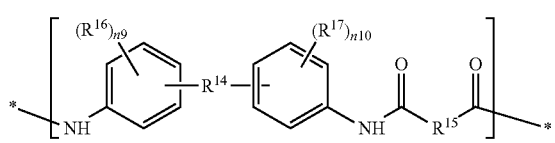

(In Formula 4, $R^{14}$s are the same or different from each other in each of the structural units and each independently include O, S, C(=O), CH(OH), S(=O)$_2$, Si(CH$_3$)$_2$, (CH$_2$)$_p$ (1≤p≤10, p being an integer), (CF$_2$)$_q$ (1≤q≤10, q being an integer), C(CH$_3$)$_2$, C(CF$_3$)$_2$, C(=O)NH, or a substituted or unsubstituted C$_6$ to C$_{30}$ aromatic organic group, the aromatic organic group being present alone or as at least two aromatic organic groups bonded to form a condensation ring or bonded to each other by a single bond, a fluorenyl group, O, S, or a functional group of C(=O), CH(OH), S(=O)$_2$, Si(CH$_3$)$_2$, (CH$_2$)$_p$ (1≤p≤10, p being an integer), (CF$_2$)$_q$ (1≤q≤10, q being an integer), C(CH$_3$)$_2$, C(CF$_3$)$_2$ or C(=O)NH;

$R^{15}$ are the same or different from each other in each of the structural units and are each independently a substituted or unsubstituted C$_6$ to C$_{30}$ aromatic organic group;

$R^{16}$ and $R^{17}$ are the same or different from each other and are each independently a halogen, a hydroxyl group, an ether group (—OR$^{212}$, R$^{212}$ being a C$_1$ to C$_{10}$ aliphatic organic group), a silyl group (—SiR$^{213}$R$^{214}$R$^{215}$, R$^{213}$, R$^{214}$ and R$^{215}$ being the same or different from one another and being each independently a hydrogen atom or a C$_1$ to C$_{10}$ aliphatic organic group), a substituted or unsubstituted C$_1$ to C$_{10}$ aliphatic organic group, or a C$_6$ to C$_{20}$ aromatic organic group; and n9 and n10 are each independently an integer of 0 to 4.)

The structural unit represented by Formula 3-1 may include at least one selected from among a structural unit represented by Formula 5 and a structural unit represented by Formula 6.

[Formula 5]

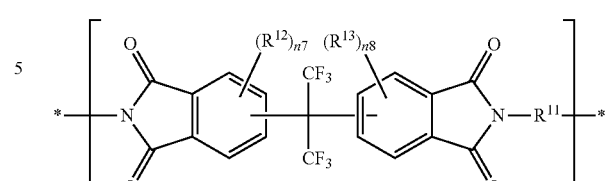

(In Formula 5,
$R^{11}$, $R^{12}$, $R^{13}$, n7 and n8 are the same as defined in Formula 3-1.)

[Formula 6]

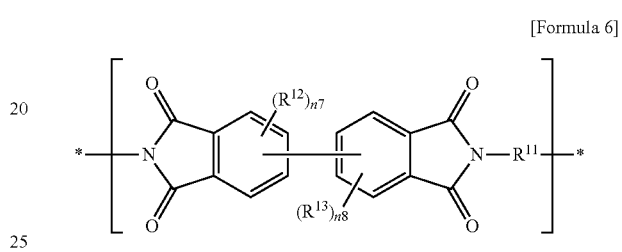

(In Formula 6,
$R^{11}$, $R^{12}$, $R^{13}$, n7 and n8 are the same as defined in Formula 3-1.)

The structural unit represented by Formula 1 may include any one of structural units represented by Formulae 7 to 9; the structural unit represented by Formula 2 may include any one of structural units represented by Formulae 10 to 12, the structural unit represented by Formula 3-1 may include any one of structural units represented by Formulae 13 and 14, the structural unit represented by Formula 3-2 may include a structural unit represented by Formula 15, and the structural unit represented by Formula 4 may include any one of structural units represented by Formulae 16 to 18.

[Formula 7]

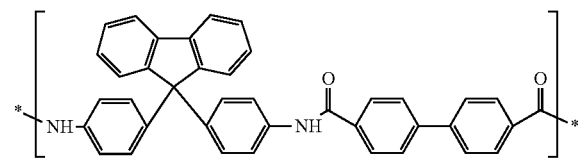

[Formula 8]

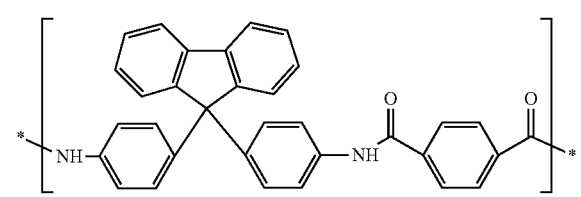

[Formula 9]

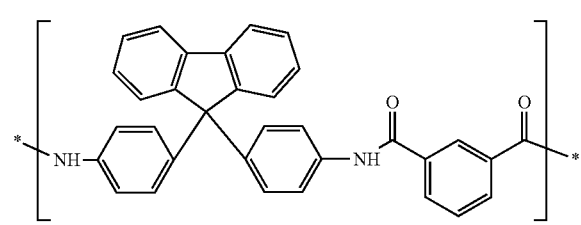

[Formula 10]
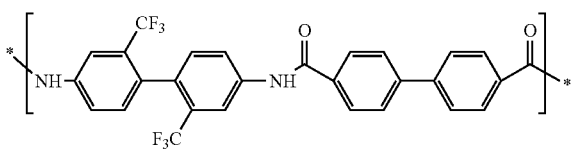

[Formula 11]
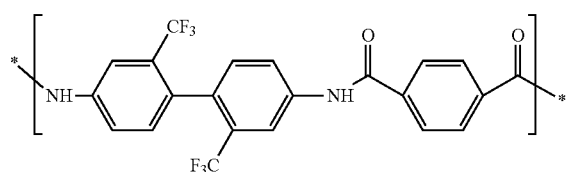

[Formula 12]
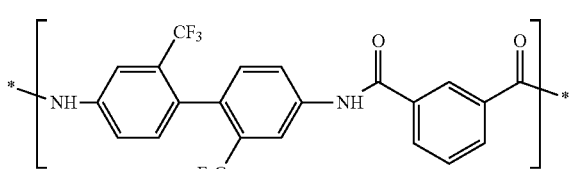

[Formula 13]
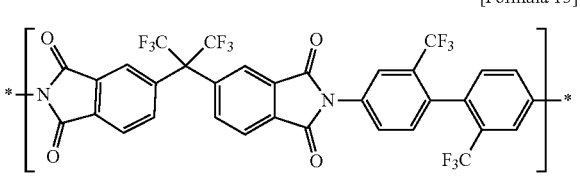

[Formula 14]
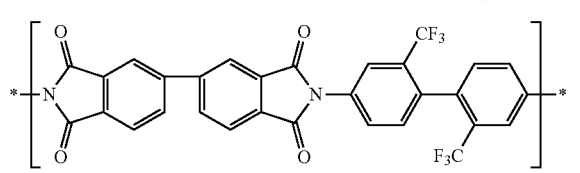

[Formula 15]
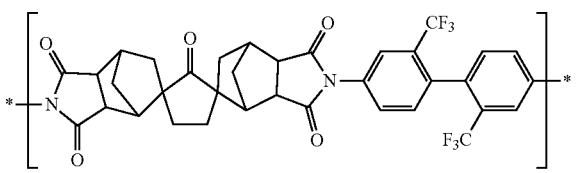

[Formula 16]
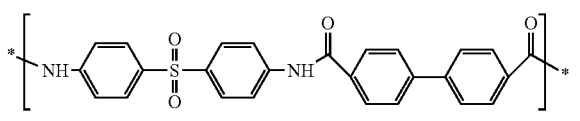

[Formula 17]
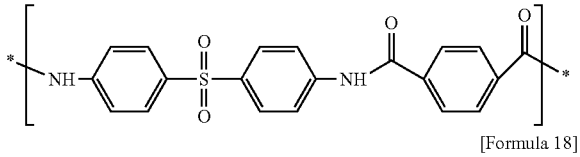

[Formula 18]
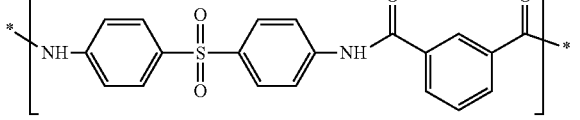

A mole ratio of all of the structural units in the first segment to all of the structural units in the second segment may be in the range of about 95:5 to about 5:95. Within this range, the window film can have high modulus.

Next, a method of preparing the poly(amide-imide) block copolymer will be described.

The poly(amide-imide) block copolymer may be prepared by a method including preparing the first segment, preparing a precursor of the second segment, copolymerizing the first segment and the precursor of the second segment, and imidizing the precursor of the second segment.

The first segment may be prepared by mixing, in a non-protic polar solvent, a diamine selected from the group consisting of 4,4'-(9-fluorenylidene)dianiline (BAPF), 2,2'-bis(trifluoromethyl)benzidine (TFDB), 4,4'-diaminodiphenyl sulfone (DADPS), bis(4-(4-aminophenoxy)phenyl) sulfone (BAPS), 2,2',5,5'-tetrachlorobenzidine, 2,7-diaminofluorene, 1,1-bis(4-amino phenyl)cyclohexane, 4,4'-methylenebis-(2-methylcyclohexylamine), 4,4-diaminooctafluorobiphenyl, 3,3'-dihydroxybenzidine, 1,3-cyclohexanediamine, and a combination thereof; and a carboxylic dichloride selected from the group consisting of terephthaloyl chloride (TPCl), isophthaloyl chloride (IPCl), biphenyl dicarbonyl chloride (BPCl), naphthalene dicarbonyl chloride, terphenyl dicarbonyl chloride, 2-fluoro-terephthaloyl chloride, and a combination thereof. The first segment may be prepared through polymerization of at least one of the aforementioned diamines and at least one of the aforementioned carboxylic dichlorides.

The second segment is an imide block and may be prepared by a typical method including preparing an amic acid block as the precursor of the second segment and imidizing the precursor of the second segment. By way of example, the second segment may be prepared by reacting tetracarboxylic anhydride and a diamine as monomers to form an amic acid block, followed by, for example, thermal solution imidization or chemical imidization of the amic acid block.

As the precursor of the second segment, the amic acid block may be prepared using a tetracarboxylic anhydride selected from among 2,2-bis-(3,4-dicarboxyphenyl) hexafluoropropane dianhydride (6FDA), 3,3',4,4'-biphenyltetracarboxylic dianhydride (BPDA), benzophenone tetracarboxylic dianhydride (BTDA), bis(3,4-dicarboxyphenyl)sulfone dianhydride, norbornan-2-spiro-α-cyclophentanon-α'-spiro-2"-norbornan-5,5",6,6"-tetracarboxylic anhydride (CpODA), and a combination thereof; and a diamine selected from among 2,2'-bis(trifluoromethyl)benzidine (TFDB), 4,4'-diaminophenyl sulfone (DADPS), 4,4'-(9-fluorenylidene)dianiline (BAPF), bis(4-(4-aminophenoxy)phenyl) sulfone (BAPS), 2,2',5,5'-tetrachlorobenzidine, 2,7-diaminofluorene, 1,1-bis(4-aminophenyl)cyclohexane, 4,4'-methylenebis-(2-methylcyclohexylamine), 4,4-diaminooctafluorobiphenyl, 3,3'-dihydrobenzidine, 1,3-cyclohexamediamine, and a combination thereof. The precursor of the second segment may be prepared by polymerizing at least one of the aforementioned tetracarboxylic anhydrides and at least one of the aforementioned diamines.

Then, the poly (amide-imide) block copolymer may be finally obtained by imidizing both terminals of the polymerized first segment and the precursor of the second segment.

The content distribution of the amide group shown in FIG. 2 may be realized through intermixing between the base layer and the buffer-layer composition upon coating the hard coating-layer composition onto a coating layer of the buffer-layer composition on an upper surface of the base layer.

More specifically, the buffer layer may be formed by coating the buffer-layer composition to a predetermined thickness on the base layer, followed by drying at about 80° C. to about 150° C. for about 5 min to about 30 min. Within this range, the buffer layer can be formed to have the content distribution of the amide group as shown in FIG. 2.

The content distribution of the amide group shown in FIG. 2 may be realized through adjustment of a solvent to be used in the hard coating-layer composition. When the solvent included in the hard coating-layer composition is a solvent capable of dissolving the buffer layer, it is possible to achieve the content distribution of the amide group according to the present invention. When the solvent included in the hard coating-layer composition is a solvent that cannot dissolve the buffer layer, it is difficult to achieve the content distribution of the amide group according to the present invention.

As shown in FIG. 2, the base layer may have a constant content of the amide group in the thickness direction thereof. Alternatively, according to a method of forming the buffer layer, the base layer may have a gradually decreasing content of the amide group from the interface between the base layer and the buffer layer to a lower surface of the base layer. As shown in FIG. 2, the hard coating layer contains no amide group. Alternatively, according to a method of forming the hard coating layer, the hard coating layer may have a gradually decreasing content of the amide group from the interface between the hard coating layer and the buffer layer to an upper surface of the hard coating layer.

The buffer layer 130 may have a thickness of about 0.1 m to about 10 m, specifically about 1 m to about 5 m. Within this range, the window film can secure adhesion between the base layer and the hard coating layer. For example, the buffer layer 130 may have a thickness of about 0.1 μm, 0.2 μm, 0.3 μm, 0.4 μm, 0.5 μm, 0.6 μm, 0.7 μm, 0.8 m, 0.9 μm, 1 μm, 2 μm, 3 μm, 4 μm, 5 μm, 6 μm, 7 μm, 8 μm, 9 μm, or 10 μm.

Although not shown in FIG. 1, the window film may further include an adhesive layer on the lower surface of the base layer 110. The adhesive layer can adhesively attach the window film to an optical element of a display apparatus. The adhesive layer may include a typical adhesive layer well-known to those skilled in the art.

Although not shown in FIG. 1, the window film may further include an antistatic layer at the interface between the base layer 110 and the buffer layer 130 and/or at the interface between the buffer layer 130 and the hard coating layer 120 to suppress generation of static electricity when applied to the display apparatus. The antistatic layer may include metal nanowires including silver nanowires and the like, antistatic materials including conductive particles, and the like, without being limited thereto.

Although not shown in FIG. 1, the window film may further include an anti-fingerprint layer on the upper surface of the hard coating layer 120. The anti-fingerprint layer can prevent a screen of the display apparatus from being spoiled due to contact with a user finger when the window film is disposed at the outermost layer of the display apparatus. The anti-fingerprint layer may be a silicone-based fingerprint layer, without being limited thereto.

Next, a flexible window film according to another embodiment will be described with reference to FIG. 3.

The flexible window film according to this embodiment includes a base layer, a buffer layer and a hard coating layer, and is substantially the same as the flexible window film according to the above embodiment except that the buffer layer of the flexible window film according to this embodiment has the content of the amide group, as shown in FIG. 3, instead of the content of the amide group, as shown in FIG. 2.

In FIG. 3, the X-axis indicates points of the window film from the hard coating layer to the base layer in the thickness direction of the window film and the Y-axis indicates the content of the amide group at a corresponding point in the window film.

The buffer layer includes, in the thickness direction thereof, a first region in which the content of the amide group gradually increases from an interface between the hard coating layer and the buffer layer, a second region in which the content of the amide group gradually decreases from an interface between the base layer and the buffer layer, and a third region between the first region and the second region. The third region has a different content of the amide group than the first region and the second region.

The third region may directly adjoin each of the first region and the second region. The third region has a substantially constant content of the amide group in the thickness direction thereof. Accordingly, the content of the amide group in the buffer layer gradually increases, becomes constant, and then gradually increases again in the thickness direction. Each of the first region, the second region and the third region may have a suitably adjusted thickness. The thickness of the third region may be about 20% to about 80%, preferably about 30% to about 70%, of the total thickness of the buffer layer. Within this range, the window film can suppress interference mura. For example, the thickness of the third region may be about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%, of the total thickness of the buffer layer.

The content distribution of the amide group shown in FIG. 3 may be realized through intermixing between the base layer and the buffer-layer composition upon coating the hard coating-layer composition on an upper surface of the base layer. More specifically, the buffer layer may be formed by coating the buffer-layer composition to a predetermined thickness on the base layer, followed by drying at about 80° C. to about 150° C. for about 5 min to about 30 min. Within this range, the window film having the content distribution of the amide group as shown in FIG. 3 can be manufactured.

Next, a flexible window film according to a further embodiment will be described with reference to FIG. 4.

The flexible window film according to this embodiment includes a base layer, a buffer layer and a hard coating layer, and is substantially the same as the flexible window film according to the above embodiment except that the buffer layer of the flexible window film according to this embodiment has the content of the amide group, as shown in FIG. 4, instead of the content of the amide group, as shown in FIG. 2.

In FIG. 4, the X-axis indicates points of the window film from the hard coating layer to the base layer in the thickness direction of the window film and the Y-axis indicates the content of the amide group at a corresponding point in the window film.

The buffer layer includes, in the thickness direction thereof, a first region in which the content of the amide group gradually increases from an interface between the hard coating layer and the buffer layer, and a second region in which the content of the amide group gradually decreases from an interface between the base layer and the buffer layer. Each of the base layer and the hard coating layer does not include the amide group.

Next, a method of fabricating a window film according to the present invention will be described.

The window film may be formed by coating the buffer-layer composition on the upper surface of the base layer to form the buffer layer on the base layer and coating a hard coating-layer composition on the buffer layer, followed by curing.

Coating may be performed by a typical method well-known to those skilled in the art. For example, the coating method may include spray coating, die coating, or spin coating, without being limited thereto. Curing may include at least one of photo-curing and heat-curing. Upon photo-curing or heat-curing, curing conditions may be adjusted according to the thickness, material and the like of each layer. Curing may be performed together with drying to reduce surface roughness and curing time of each layer.

Next, a display apparatus according to the present invention will be described.

The display apparatus according to the present invention may include the flexible window film according to the present invention. The display apparatus may be a flexible display apparatus or a non-flexible display apparatus. For example, the display apparatus may include a light emitting diode display including an organic light emitting diode display and the like, and a liquid crystal display, without being limited thereto.

MODE FOR INVENTION

Next, the present invention will be described in more detail with reference to some examples. It should be understood that these examples are provided for illustration only and are not to be construed in any way as limiting the present invention.

Preparative Example: Preparation of Hard Coating-Layer Composition

A hard coating-layer composition was prepared by mixing 67 parts by weight of a dendrimer type acrylic resin (Sirius 501, Osaka Organic Chemical Industry Co., Ltd.), 1 part by weight of a photo initiator (Irgacure-184, BASF), 31.5 parts by weight of methyl ethyl ketone (MEK), and 0.5 parts by weight of a leveling agent (BYK-350).

Example 1

In a 500 mL round-bottom flask, 1.0 mol of 2,2'-bis(trifluoromethyl)benzidine (TFDB), 0.7 mol of terephthaloyl chloride (TPCl) and 2.8 mol of pyridine were reacted in N,N-dimethylacetamide at 25° C. for 3 hours, and 7 mol of a 5 wt % NaCl aqueous solution was added to the resulting product to obtain a solid component, followed by stirring the solid component for 10 min to precipitate the solid component, which in turn was stirred again in 3 mol of purified water for 30 min, thereby preparing a solid component. By repeating such purification twice, a first segment of a pure amide block was obtained.

In a 500 mL round-bottom flask, 0.55 mol of 2,2-bis-(3,4-dicarboxyphenyl)hexafluoropropane dianhydride (6FDA), 0.45 mol of 3,3',4,4'-biphenyltetracarboxylic dianhydride (BPDA) and 1.0 mol of the first segment were reacted for copolymerization in N,N-dimethylacetamide at 5° C. for 24 hours, and 0.0016 mol of acetic anhydride and 0.0016 mol of Pyridine were added to the resulting product, followed by stirring the resulting product at 25° C. for 48 hours to obtain a poly(amide-imide) block copolymer through chemical imidization.

The prepared poly(amide-imide) block copolymer was mixed with methyl ethyl ketone (MEK) to prepare a buffer-layer composition.

A poly(amide imide) film (thickness: 50 μm, Kolon Co., Ltd.) was used as a base layer. The prepared buffer-layer composition was coated onto an upper surface of the poly-imide film and dried at 130° C. for 30 min to form a 2 μm thick buffer layer. The hard coating-layer composition prepared in Preparative Example was coated onto an upper surface of the buffer layer and dried at 100° C. for 10 min to form a 7 μm thick hard coating layer, thereby preparing a window film.

Example 2

A window film was prepared in the same manner as in Example 1 except that the buffer layer was formed to have a thickness of 1 m.

Example 3

A window film was prepared in the same manner as in Example 1 except that the buffer layer was formed to have a thickness of 4 m.

Example 4

A window film was prepared in the same manner as in Example 1 except that CpODA (JXTG, compound represented by Formula 19) was used instead of 3,3',4,4'-biphe-nyltetracarboxylic dianhydride (BPDA) in preparation of the first segment and the second segment.

[Formula 19]

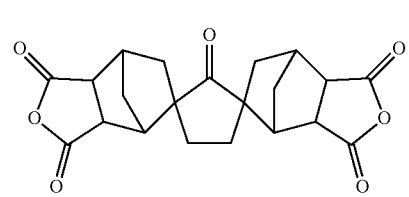

Example 5

A window film was prepared in the same manner as in Example 1 except that a polyimide film (thickness: 50 μm, Tiemide Co., Ltd.) was used as the base layer instead of the poly(amide imide) film (thickness: 50 μm, Kolon Co., Ltd.).

Comparative Example 1

A window film was prepared by coating the hard coating-layer composition prepared in Preparative Example on an upper surface of a polyimide film (thickness: 50 μm, Kolon Co., Ltd.) as the base layer, followed by drying at 100° C. for 10 min to form a 7 μm thick hard coating layer. A buffer layer was not formed in the window film.

Comparative Example 2

A typical amic acid was prepared using the second segment along without the first segment and a composition for an amide group-free intermediate layer was prepared through chemical imidization using pyridine.

The prepared composition for the amide group-free layer was coated onto an upper surface of a polyimide film (thickness: 50 μm, Kolon Co., Ltd.) as the base layer and dried at 130° C. for 30 min to form a 2 μm thick layer. The hard coating-layer composition prepared in Preparative Example was coated onto an upper surface of the layer and dried at 100° C. for 10 min to form a 7 μm thick hard coating layer, thereby preparing a window film.

Although the window film included the intermediate layer between the base layer and the hard coating layer, the intermediate layer did not contain the amide group.

Comparative Example 3

A composition for layer formation was prepared in the same manner as in Example 1.

A hard coating-layer composition was prepared using propylene glycol monomethyl ether acetate (PGMEA) instead of methyl ethyl ketone (MEK) used in Preparative Example. Methyl ethyl ketone can dissolve the buffer layer whereas propylene glycol monomethyl ether acetate cannot dissolve the buffer layer.

The prepared composition for layer formation was coated onto an upper surface of a polyimide film (thickness: 50 μm, Kolon Co., Ltd.) as the base layer and dried at 130° C. for 30 min to form a 2 μm thick layer. The prepared hard coating-layer composition was coated onto an upper surface of the layer and dried at 100° C. for 10 min to form a 7 μm thick hard coating layer, thereby preparing a window film. Although the window film included an amide group-containing layer between the base layer and the hard coating layer, the intermediate layer has substantially the same content of the amide group in the thickness direction thereof.

The flexible window films prepared in Examples and Comparative Examples were evaluated as to the following properties and evaluation results are shown in Table 1.

(such that the hard coating layer was placed at the uppermost side), followed by evaluation of interference mura and rainbow mura with the naked eye at an angle of 450 under a three-wavelength lamp. A specimen allowing no observation of rainbow mura was rated as ⊚, a specimen allowing slight observation of rainbow mura was rated as Δ, and a specimen allowing severe observation of rainbow mura was rated as X.

(3) Light transmittance and haze (unit: %): Haze was measured using a haze meter (NDH2000, Nippon Denshoku) and light transmittance was measured using a CM-3600A (Konica Minolta).

(4) Degree of yellowness: Degree of yellowness was evaluated on the hard coating layer under a D65 light source at 2° using a colorimeter (CM-3600D, Konica Minolta).

(5) Wear resistance (unit: time): A tip (diameter: 11 mm) equipped with steel wool (Ribenon #0000) was placed on a window coating layer of a window film and moved thereon at a speed of 60 mm/sec over a movement distance of 40 mm under a load of 1.5 kg by a scuff tester. This test was repeated 10 times and the number of scratches was recorded. A smaller number of scratches indicates better scratch resistance.

(6) Flexural reliability (unit: time): Flexural reliability was evaluated by bending a specimen to have a radius of curvature of 1 mm at 60° C. and 95% RH as high temperature/humidity conditions and at −40° C. as a low temperature condition. The window film was cut into a rectangular specimen having a length of 2.5 cm and a width of 15 cm. With the prepared specimen wound around a jig having a radius of curvature of 1 mm such that the hard coating layer contacted the jig, the minimum number of times at which cracks were first generated in the window film was evaluated upon repeating operation of rolling and unrolling the specimen.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Content distribution of amide group in buffer layer | FIG. 2 | FIG. 2 | FIG. 3 | FIG. 2 | FIG. 4 | — | No amide group | Constant content of amide group in thickness direction |
| Rainbow | ⊚ | ⊚ | ⊚ | ⊚ | ⊚ | X | X | Δ |
| Transmittance | 90.8 | 90.5 | 90.5 | 90.8 | 90.8 | 90.5 | 90.5 | 90.5 |
| Haze | 0.7 | 0.8 | 0.9 | 0.8 | 0.6 | 0.7 | 0.7 | 0.7 |
| Degree of yellowness | 1.1 | 1.3 | 1.1 | 1.1 | 1.8 | 1.0 | 1.0 | 1.0 |
| Wear resistance | 10 times pass | 10 times pass | 10 times pass | 10 times pass | 10 times pass | 10 times pass | 10 times pass | 10 times pass |
| Flexural reliability under high temperature/ humidity conditions | 200,000 times pass | 200,000 times pass | 200,000 times pass | 200,000 times pass | 200,000 times pass | 200,000 times pass | 200,000 times pass | 200,000 times pass |
| Flexural reliability at low temperature | 200,000 times pass | 200,000 times Pass | 200,000 times pass | 200,000 times pass | 200,000 times pass | 200,000 times pass | 200,000 times pass | 200,000 times pass |

Property Evaluation (1) Content distribution of amide group in buffer layer: The content distribution of the amide group in the buffer layer was evaluated in the thickness direction of the buffer layer by a surface IR measurement method.

(2) Rainbow: An adhesive and a window film were sequentially stacked on an upper surface of a black sheet As shown in Table 1, the flexible window films according to the present invention prevented rainbow spots from being observed and exhibited good flexural reliability under high temperature/humidity conditions and at low temperature.

Conversely, the window film of Comparative Example 1 in which no buffer layer was formed between the base layer and the hard coating layer, the window film of Comparative Example 2 in which the amide group-containing intermediate layer was formed between the base layer and the hard coating layer, and the window film of Comparative Example 3 in which the amide group-containing layer not including the first region and the second region was formed between the base layer and the hard coating layer did not have the advantageous effects of the present invention.

It should be understood that various modifications, changes, alterations, and equivalent embodiments can be made by those skilled in the art without departing from the spirit and scope of the present invention.

The invention claimed is:

1. A window film comprising:
a base layer, a buffer layer and a hard coating layer sequentially stacked one above another in the stated order,
wherein the buffer layer comprises, in a thickness direction thereof, a first region in which a content of an amide group gradually increases from an interface between the hard coating layer and the buffer layer, and a second region in which the content of the amide group gradually decreases from an interface between the base layer and the buffer layer,
wherein the buffer layer comprises a poly (amide-imide) block copolymer, and
wherein the base layer comprises a material different from the poly (amide-imide) block copolymer in the buffer layer.

2. The window film according to claim 1, wherein the first region directly adjoins the second region.

3. The window film according to claim 1, wherein the buffer layer further comprises a third region disposed between the first region and the second region and having a different content distribution of the amide group than the first region and the second region.

4. The window film according to claim 3, wherein the third region has a constant content of the amide group in the thickness direction.

5. The window film according to claim 3, wherein a thickness of the third region ranges from about 20% to about 80% of a total thickness of the buffer layer.

6. The window film according to claim 1, wherein the poly (amide-imide) block copolymer comprises a first segment comprising a structural unit of Formula 1, a structural unit of Formula 2 or a combination thereof, and a second segment comprising a structural unit of Formula 3-1, a structural unit of Formula 3-2 or a combination thereof:

[Formula 1]

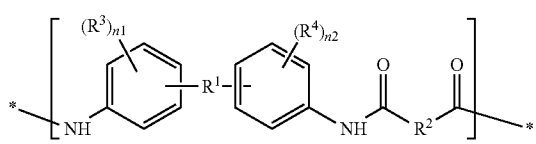

in Formula 1,
R$^1$s are the same or different from each other in each of the structural units and are each independently a substituted or unsubstituted C$_3$ to C$_{30}$ alicyclic organic group, a substituted or unsubstituted C$_6$ to C$_{30}$ aromatic organic group, a substituted or unsubstituted C$_2$ to C$_{30}$ hetero ring group, or a substituted or unsubstituted C$_{13}$ to C$_{20}$ fluorenyl group;

R$^2$s are the same or different from each other in each of the structural units and are each independently a substituted or unsubstituted C$_6$ to C$_{30}$ aromatic organic group;
R$^3$ and R$^4$ are the same or different from each other and are each independently a halogen, a hydroxyl group, an ether group represented by —OR$^{200}$, R$^{200}$ being a C$_1$ to C$_{10}$ aliphatic organic group, a silyl group represented by —SiR$^{201}$R$^{202}$R$^{203}$, R$^{201}$, R$^{202}$ and R$^{203}$ being the same or different from one another and being each independently a hydrogen atom or a C$_1$ to C$_{10}$ aliphatic organic group, a substituted or unsubstituted C$_1$ to C$_{10}$ aliphatic organic group, or a C$_6$ to C$_{20}$ aromatic organic group; and
n1 and n2 are each independently an integer of 0 to 4;

[Formula 2]

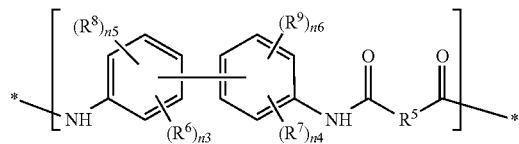

in Formula 2,
R$^5$s are the same or different from each other in each of the structural units and are each independently a substituted or unsubstituted C$_6$ to C$_{30}$ aromatic organic group;
R$^6$ and R$^7$ are the same or different from each other and are each independently an electron withdrawing group;
R$^8$ and R$^9$ are the same or different from each other and are each independently a halogen, a hydroxyl group, an ether group represented by —OR$^{204}$, R$^{204}$ being a C$_1$ to C$_{10}$ aliphatic organic group, a silyl group represented by —SiR$^{205}$R$^{206}$R$^{207}$, R$^{205}$, R$^{206}$ and R$^{207}$ being the same or different from one another and being each independently a hydrogen atom or a C$_1$ to C$_{10}$ aliphatic organic group, a substituted or unsubstituted C$_1$ to C$_{10}$ aliphatic organic group, or a C$_6$ to C$_{20}$ aromatic organic group;
n3 is an integer of 1 to 4, n5 is an integer of 0 to 4, and n3+n5 is an integer of 1 to 4; and
n4 is an integer of 1 to 4, n6 is an integer of 0 to 4, and n4+n6 is an integer of 1 to 4;

[Formula 3-1]

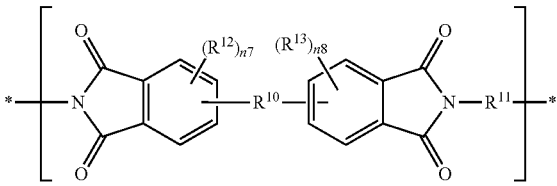

in Formula 3-1,
R$^{10}$s are the same or different from each other in each of the structural units and are each independently a single bond, a substituted or unsubstituted C$_1$ to C$_{30}$ aliphatic organic group, a substituted or unsubstituted C$_3$ to C$_{30}$ alicyclic organic group, a substituted or unsubstituted C$_6$ to C$_{30}$ aromatic organic group, or a substituted or unsubstituted C$_2$ to C$_{30}$ hetero ring group;

$R^{11}$s are the same or different from each other in each of the structural units and each independently comprise a substituted or unsubstituted $C_6$ to $C_{30}$ aromatic organic group, the aromatic organic group being present alone or as at least two aromatic organic groups bonded to form a condensation ring or bonded to each other by a single bond, a fluorenyl group, O, S, or a functional group of C(=O), CH(OH), S(=O)$_2$, Si(CH$_3$)$_2$, (CH$_2$)$_p$ in which p is an integer selected from 1 to 10, (CF$_2$)$_q$ in which q is an integer selected from 1 to 10, C(CH$_3$)$_2$, C(CF$_3$)$_2$, or C(=O)NH;

$R^{12}$ and $R^{13}$ are the same or different from each other and are each independently a halogen, a hydroxyl group, an ether group represented by —OR$^{208}$, R$^{208}$ being a $C_1$ to $C_{10}$ aliphatic organic group, a silyl group represented by —SiR$^{209}$R$^{210}$R$^{211}$, R$^{209}$, R$^{210}$ and R$^{211}$ being the same or different from one another and being each independently a hydrogen atom or a $C_1$ to $C_{10}$ aliphatic organic group, a substituted or unsubstituted $C_1$ to $C_{10}$ aliphatic organic group, or a $C_6$ to $C_{20}$ aromatic organic group; and n7 and n8 are each independently an integer of 0 to 3;

[Formula 3-2]

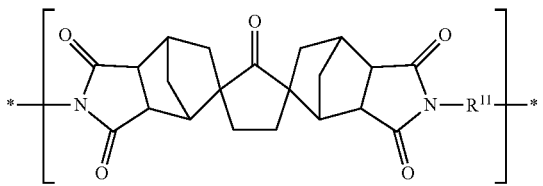

in Formula 3-2, $R^{11}$ is the same as defined in Formula 3-1.

7. The window film according to claim 1, wherein the buffer layer has a thickness of about 0.1 μm to about 10 μm.

8. The window film according to claim 1, wherein the base layer comprises a film comprising at least one selected from among a poly (amide imide) resin and a polyimide resin.

9. The window film according to claim 1, wherein the base layer comprises an amide group and has a constant content of the amide group in the thickness direction thereof.

10. The window film according to claim 1, wherein the hard coating layer comprises a (meth)acrylic resin.

11. The window film according to claim 10, wherein the hard coating layer is formed of a composition comprising at least one selected from among a dendrimer type (meth)acrylic resin and a hyper-branched type (meth)acrylic resin.

12. The window film according to claim 1, wherein the hard coating layer is free from an amide group.

13. The window film according to claim 1, wherein a difference in index of refraction between the base layer and the hard coating layer ranges from about 0.1 to about 0.4.

14. The window film according to claim 1, further comprising:
an antistatic layer at at least one of an interface between the base layer and the buffer layer or an interface between the buffer layer and the hard coating layer.

15. The window film according to claim 14, wherein the antistatic layer comprises metal nanowires.

16. A display apparatus comprising the window film according to claim 1.

17. The window film according to claim 1, wherein the base layer does not include the amide group.

18. The window film according to claim 1, wherein each of the base layer and the hard coating layer does not include the amide group.

* * * * *